(12) United States Patent
Hatano et al.

(10) Patent No.: US 10,889,521 B2
(45) Date of Patent: Jan. 12, 2021

(54) GLASS PLATE AND FORMATION METHOD THEREOF

(71) Applicant: AGC INC., Chiyoda-ku (JP)

(72) Inventors: Maya Hatano, Tokyo (JP); Kazuhiko Yamanaka, Tokyo (JP); Satoshi Kanasugi, Tokyo (JP)

(73) Assignee: AGC INC., Chiyoda-ku (JP)

(*) Notice: Subject to any disclaimer, the term of this patent is extended or adjusted under 35 U.S.C. 154(b) by 0 days.

(21) Appl. No.: 16/514,447

(22) Filed: Jul. 17, 2019

(65) Prior Publication Data

US 2019/0345053 A1 Nov. 14, 2019

Related U.S. Application Data

(63) Continuation of application No. PCT/JP2018/001275, filed on Jan. 17, 2018.

(30) Foreign Application Priority Data

Jan. 19, 2017 (JP) ................................. 2017-007799

(51) Int. Cl.
*C03B 23/025* (2006.01)
*C03C 21/00* (2006.01)

(52) U.S. Cl.
CPC ........ *C03B 23/0252* (2013.01); *C03C 21/002* (2013.01)

(58) Field of Classification Search
CPC ............................ C03B 23/0252; C03C 21/002
See application file for complete search history.

(56) References Cited

U.S. PATENT DOCUMENTS

2011/0129648 A1 6/2011 Gu
2011/0293928 A1 12/2011 Chu et al.
(Continued)

FOREIGN PATENT DOCUMENTS

JP 2015-13774 1/2015
JP 2015-27936 2/2015
(Continued)

OTHER PUBLICATIONS

International Search Report dated Apr. 10, 2018 in PCT/JP2018/001275 filed Jan. 17, 2018 (with English translation).
(Continued)

*Primary Examiner* — Samir Shah
*Assistant Examiner* — Tong Guo
(74) *Attorney, Agent, or Firm* — Oblon, McClelland, Maier & Neustadt, L.L.P.

(57) ABSTRACT

A glass plate, curved around a first axis, has a first surface being concave and a second surface being convex. In a cross sectional view of a plane perpendicular to the first axis, both end portions of the second surface are chemically strengthened. Compressive stress produced by ion exchange in the both end portions of the second surface is larger than that of the first surface. An X axis includes a line segment connecting one end point and a point, most distant from the one end point, on the cross section of the second surface. A Y axis passes a center point of the line segment, and positive direction is from a first surface toward a second surface. A second-order coefficient of a quadratic curve that approximates second-order differential values of a locus of a partial shape in a positive Y value region in the cross section is negative.

9 Claims, 11 Drawing Sheets

(56) References Cited

U.S. PATENT DOCUMENTS

2016/0137550 A1   5/2016  Murata et al.
2018/0009705 A1*  1/2018  Ishibashi ............... C03C 17/225

FOREIGN PATENT DOCUMENTS

| JP | 2015-34123 | 2/2015 | | |
|---|---|---|---|---|
| WO | WO 2011/066246 A1 | 6/2011 | | |
| WO | WO 2015/057552 A2 | 4/2015 | | |
| WO | WO 2015/125584 A1 | 8/2015 | | |
| WO | WO 2016/149861 A1 | 9/2016 | | |
| WO | WO-2016158623 A1 * | 10/2016 | ........... | C03C 17/225 |

OTHER PUBLICATIONS

Written Opinion dated Apr. 10, 2018 in PCT/JP2018/001275 filed Jan. 17, 2018.

* cited by examiner

FIG. 9

| | | Coefficient of $X^2$ of Quadratic | $\Delta$ | M | R | L | H | $\Delta/(L*(H/R))$ | $M/(L*(H/R))$ |
|---|---|---|---|---|---|---|---|---|---|
| Example | A-1 | -3.30E-07 | 0.4214 | 2.8209 | 140.5 | 308.24 | 76.38682 | 2.51.E-03 | 1.68.E-02 |
| | A-2 | -1.28E-06 | 0.5070 | 3.3647 | 133.9 | 313.1574 | 81.5811 | 2.66.E-03 | 1.76.E-02 |
| | B-1 | -8.00E-07 | 0.6644 | 3.9888 | 129.5 | 304.4491 | 79.62944 | 3.55.E-03 | 2.13.E-02 |
| | B-2 | -8.57E-07 | 0.6043 | 4.1845 | 134.0 | 299.5927 | 75.36339 | 3.59.E-03 | 2.48.E-02 |
| Comparative Ex | C | 2.87E-07 | 0.8910 | 5.4010 | 276.1 | 303.1059 | 40.56025 | 2.00.E-02 | 1.21.E-01 |

GLASS PLATE AND FORMATION METHOD THEREOF

TECHNICAL FIELD

The present invention relates to a glass plate and its forming method.

BACKGROUND ART

In glass plate forming techniques for bending into a cylindrical shape, glass plates having a curved shape and forming methods therefor are known, the glass plates being formed by deforming a glass plate plastically by heating it at a temperature lower than its softening temperature to give high surface accuracy to the glass plate (refer to Patent documents 1 and 2).

Patent document 1 discloses a manufacturing method of a curved glass plate which has a step of deforming an original glass plate elastically by pressing it from both sides using a jig and a step of heating the elastically deformed original glass plate at a temperature lower than a softening temperature of glass of which the original glass plate is made and deforming the original glass plate plastically into a curved shape. Patent document 1 states that this manufacturing method can manufacture a curved glass plate with high surface accuracy by a simple process. Patent document 2, which is similar to Patent document 1, discloses a manufacturing method of a curved glass plate in which an original glass plate is heated while being deformed elastically by pressing it from both sides using a jig to chemically strengthen the original glass plate by causing ion exchange at the glass plate surfaces. In particular, the front surface and the back surface are given a difference in expansion by making the degree of chemical strengthening of the front surface of the glass plate and that of the back surface different from each other. Patent document 2 states that a curved glass plate can be manufactured that is increased in strength and durability.

CITATION LIST

Patent Literature

Patent document 1: JP-A-2015-27936
Patent document 2: WO 2015/57552

SUMMARY OF INVENTION

Technical Problem

Both of Patent documents 1 and 2 disclose a forming method in which a flat-plate-like glass plate is fixed by pressing it from both sides using a jig so that the glass plate is deformed elastically in such directions that its two sides come closer to each other and the glass plate is curved by deforming it plastically through stress relaxation caused by heating. However, in these techniques in which a glass plate is formed (curved forcibly) into a prescribed shape at an initial stage of the formation, the curved shape of the overall glass plate tends to become a parabolic shape or the like in cross section because an initial-stage shape is determined by fixedly supporting both end portions of it. This results in a problem that it is difficult to form end portions of a glass plate and a glass plate both end portions of which are bend-formed sufficiently cannot be obtained.

An object of the present invention is to provide a glass plate both end portions of which are bend-formed sufficiently and a forming method therefor.

Solution to Problem

A glass plate according to the invention has: a first surface; and
a second surface which is opposed to the first surface, wherein
the glass plate is curved around a first axis in such a manner that the first surface is a concave surface and the second surface is a convex surface,
in a cross sectional view of a plane that is perpendicular to the first axis,
at least both end portions of the second surface are chemically strengthened and compressive stress produced by ion exchange in both of the end portions of the second surface is larger than compressive stress produced by ion exchange in both end portions of the first surface, and
when an X axis is defined as a line including a line segment that connects one end point on the cross section of the second surface and a point, most distant from the one end point of the second surface, on the cross section of the second surface, a Y axis is defined as a line that passes a center point of the line segment and is perpendicular to the X axis, an origin is defined as an intersection of the X axis and the Y axis, and a positive direction of the Y axis is defined as a direction, going from a first surface side toward a second surface side, of the Y axis,
a second-order coefficient of a quadratic curve that approximates second-order differential values of a locus of a partial shape of a portion in a positive Y value region in the cross section of the second surface is negative.

A glass plate forming method according to the invention includes:
a heating step of heating a glass plate to a temperature that is lower than a softening temperature;
a chemically strengthening step of chemically strengthening two end portions opposed to each other of a second surface, among a first surface of the glass plate and the second surface of the glass plate that is opposed to the first surface, during the heating step so that compressive stress in the second surface is larger than that in the first surface; and
a supporting step of supporting the two end portions in a movable state while urging the two end portions in such directions that they come closer to each other, during the chemically strengthening step.

Advantageous Effects of Invention

The invention can provide a glass plate both end portions of which are bend-formed sufficiently and a forming method therefor.

BRIEF DESCRIPTION OF DRAWINGS

FIG. 9 is a table showing values of quadratic curves shown in FIG. 7 and FIG. 8 and values obtained from virtual circular arcs.

DESCRIPTION OF EMBODIMENTS

Specific embodiments of a glass plate and its manufacturing method according to the present invention is hereinafter described in detail with reference to the drawings.

Figure 1:
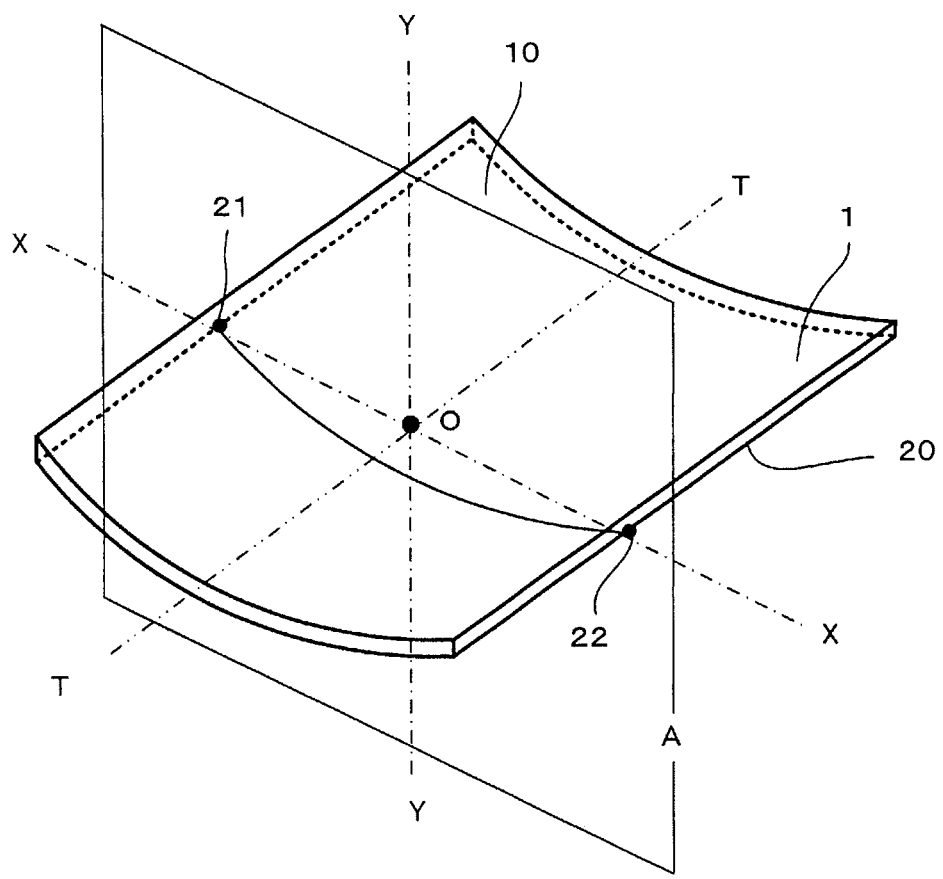
FIG. 1 is a front perspective view of an example glass plate according to the present invention.
Figure 2:
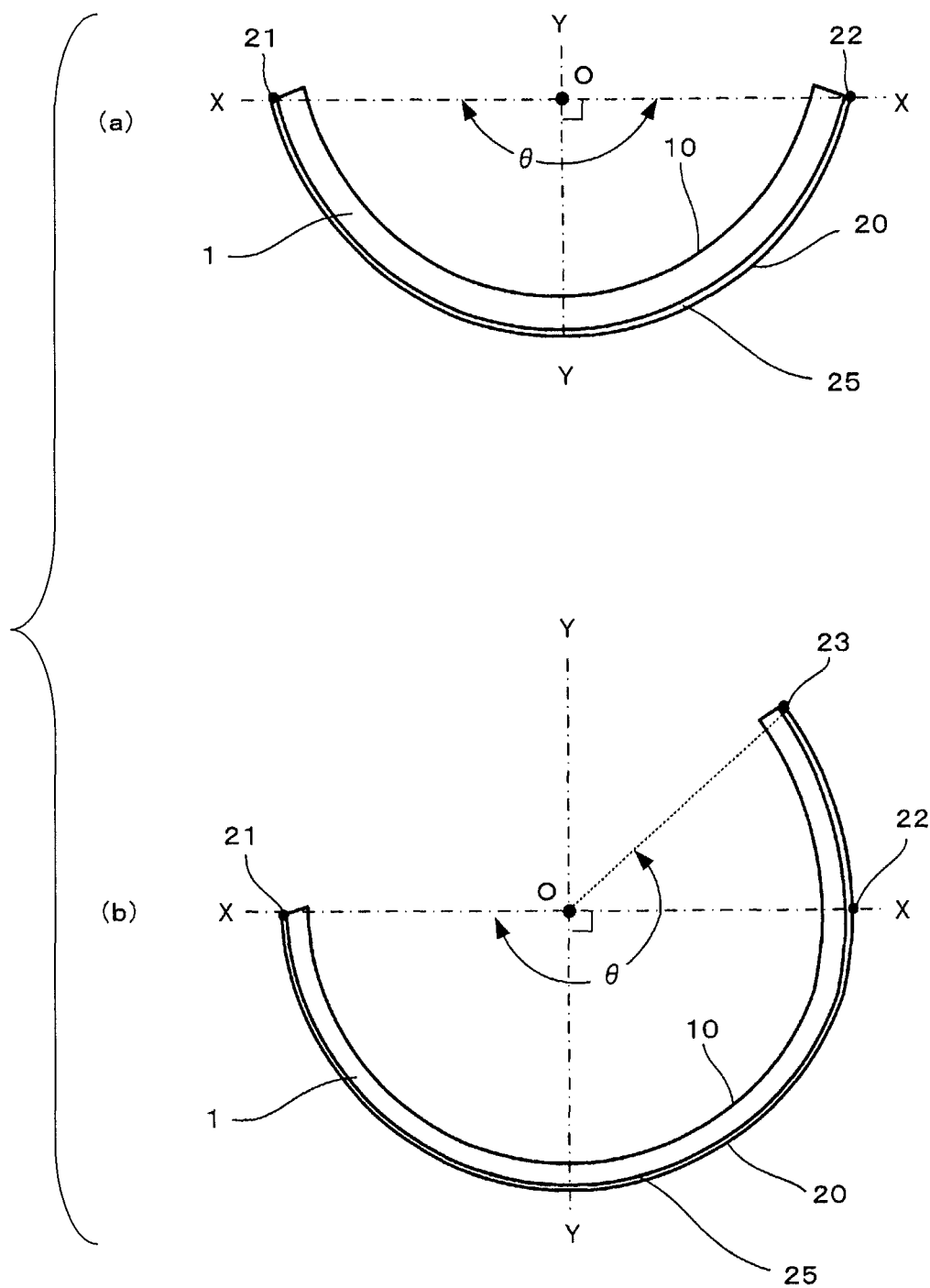
FIG. 2 is sectional views taken by a cutting plane A in FIG. 1; part (a) of FIG. 2 shows a first embodiment and part (b) of FIG. 2 shows a second embodiment.

FIG. 1 is a front perspective view of an example glass plate according to the invention. FIG. 2 is example sectional views taken by plane A in FIG. 1; part (a) of FIG. 2 shows a glass plate according to a first embodiment and part (b) of FIG. 2 shows a glass plate according to a second embodiment. The example glass plates will be described in detail with reference to FIG. 1 and FIG. 2.

FIG. 2 shows glass plates which can be manufactured by forming method Means-2 and Means-3 described later and both end portions of which are bent sufficiently, and overall sectional shapes of which are a circular arc. However, the overall sectional shape of the glass plate according to the invention is not necessarily limited to a circular arc; it suffices that both end portions of it be bent sufficiently.

The glass plate 1 according to each of the embodiments has a curved shape and has a first surface 10 and a second surface 20 which is opposed to the first surface 10. Since the glass plate 1 has a curved shape, the first surface 10 and the second surface 20 are defined as a concave surface and a convex surface, respectively. A first axis T is defined as an axis that is parallel with the longitudinal direction of the glass plate 1, and the glass plate 1 can be described as being curved around the first axis T.

Furthermore, in a cross sectional view of plane A which is perpendicular to the first axis T (in the following, the term "cross section" means a cross section taken by plane A when it is used alone), a first point 21 is defined as an end point on a cross section of the second surface 20, a second point 22 is defined as a point, most distant from the first point 21, on the cross section of the second surface 20, and the X axis is defined as a line including a line segment that connects the first point 21 and the second point 22. In the cross sectional view of plane A, the Y axis is defined as a line that passes the center point of the X axis and is perpendicular to the X axis and the origin O is defined as the intersection of the X axis and the Y axis. The positive direction of the Y axis is defined as a direction that goes from the first surface 10 toward the second surface 20.

In each of the embodiments, in the cross section of the second surface 20, the second-order coefficient of a quadratic curve that approximates second-order differential values of a locus of a partial shape of a portion, in a positive Y value region, of the cross section of the second surface 20 is negative. That is, a glass plate both end portions of which are bend-formed sufficiently can be obtained. Details are described later.

As shown in part (a) of FIG. 2, the first embodiment is a glass plate 1 in which the both end points of a cross section of the second surface are the first point 21 and the second point 22 and the central angle θ of a sector obtained by connecting the first point 21, the second point 22, and the origin O (in the following, also referred to simply as a "central angle θ") is equal to 180°.

The second embodiment is shown in part (b) of FIG. 2. The first point 21 is defined as one end point on a cross section of the second surface 20 and a third point 23 is newly defined as the other end point. The second point 22 is a point that is most distant from the first point 21 on the cross section of the second surface 20, and the origin O is the center of a circular arc that is a shape of the glass plate 1. The second embodiment is the glass plate 1 in which the central angle θ of a sector obtained by connecting the first point 21 and the third point 23 as the both end points of the cross section of the second surface and the origin O is larger than 180°. The inventors of the present application have confirmed experimentally that a glass plate whose central angle is larger than or equal to 180° can be formed by increasing the chemically strengthening time.

A chemically strengthening treatment layer 25 is formed in the second surface 20. For example, the chemically strengthening treatment is performed by a method of applying a molten salt in paste or powder form to the second surface 20 and exchanging an alkaline ion inside the glass with an alkaline ion in the molten salt. More specifically, the chemically strengthening treatment is performed by a method of exchanging at least one of a lithium ion and a sodium ion in the glass plate 1 with a potassium ion having a larger ion diameter. The chemically strengthening treatment can increase the mechanical strength of the glass plate 1 by providing surface compressive stress at the surface of the glass plate 1.

Although the embodiments are examples in which only the overall second surface 20 is chemically strengthened, the invention is not limited to this case. That is, both of the second surface 20 and the first surface 10 are chemically strengthened and the first surface 10 is also given compressive stress that is produced by ion exchange. Where both of the second surface 20 and the first surface 10 are chemically strengthened, the compressive stress that is produced by ion exchange in the second surface 20 is set larger than that produced by ion exchange in the first surface 10. As a result, both end portions are bent sufficiently and it is easier for the glass plate 1 to have a circular arc shape which is a beautiful curved shape. In this specification, the phrase "compressive stress that is produced by ion exchange" at the first surface 10 includes a case that it is equal to 0. Furthermore, only both end portions of the second surface 20 may be chemically strengthened (forming method Means-1 to be described later).

There are no particular limitations on the glass material to be used for manufacturing the chemically strengthened glass plates according to the embodiments except that ion exchange should be able to be performed on it. For example, selection can be made as appropriate from soda-lime glass, aluminosilicate glass, lithium aluminosilicate glass, borosilicate glass, aluminoborosilicate glass, etc.

There are no particular limitations on the composition of a glass plate material used in the embodiments; example compositions are, as represented by mole percentages, 50% to 80% of $SiO_2$, 0.1% to 30% of $Al_2O_3$, 3% to 30% of $Li_2O+Na_2O+K_2O$, 0% to 25% of MgO, 0% to 25% of CaO, and 0% to 5% of $ZrO_2$. More specific glass compositions are as follows. For example, the phrase "containing 0% to 25% of MgO" means that MgO is not indispensable and may be contained by up to 25%.

(i) Glass containing, as represented by mole percentages, 63% to 73% of $SiO_2$, 0.1% to 5.2% of $Al_2O_3$, 10% to 16% of $Na_2O$, 0% to 1.5% of $K_2O$, 5% to 13% of MgO, and 4% to 10% of CaO.

(ii) Glass that contains, as represented by mole percentages, 50% to 74% of $SiO_2$, 1% to 10% of $Al_2O_3$, 6% to 14% of $Na_2O$, 3% to 11% of $K_2O$, 2% to 15% of MgO, 0% to 6% of CaO, and 0% to 5% of $ZrO_2$, and in which the total content of $SiO_2$ and $Al_2O_3$ is 75% or smaller, the total content of $Na_2O$ and $K_2O$ is 12% to 25%, and the total content of MgO and CaO is 7% to 15%.

(iii) Glass containing, as represented by mole percentages, 68% to 80% of $SiO_2$, 4% to 10% of $Al_2O_3$, 5% to 15% of $Na_2O$, 0% to 1% of K2O, 4% to 15% of MgO, and 0% to 1% of $ZrO_2$.

(iv) Glass that contains, as represented by mole percentages, 67% to 75% of $SiO_2$, 0% to 4% of $Al_2O_3$, 7% to 15% of $Na_2O$, 1% to 9% of $K_2O$, 6% to 14% of MgO, and 0% to 1.5% of $ZrO_2$, and in which the total content of $SiO_2$ and $Al_2O$ is 71% to 75% and the total content of $Na_2O$ and $K_2O$ is 12% to 20%, and the content of CaO, if any, is smaller than 1%.

(v) Glass that contains, as represented by mole percentages, 60% to 72% of $SiO_2$, 8% to 16% of $Al_2O_3$, 8% to 18% of $Na_2O$, 0% to 3% of $K_2O$, 0% to 10% of MgO, and 0% to 5% of $ZrO_2$, and in which the content of CaO, if any, is smaller than 1%.

(vi) Glass containing, as represented by mole percentages, 56% to 73% of $SiO_2$, 10% to 24% of $Al_2O_3$, 0% to 6% of $B_2O_3$, 0% to 6% of $P_2O_5$, 2% to 7% of $Li_2O$, 3% to 11% of $Na_2O$, 0% to 2% of $K_2O$, 0% to 8% of MgO, and 0% to 2% of CaO, 0% to 5% of SrO, 0% to 5% of BaO, 0% to 5% of ZnO, 0% to 2% of $TiO_2$, and 0% to 4% of $ZrO_2$.

Figure 3:
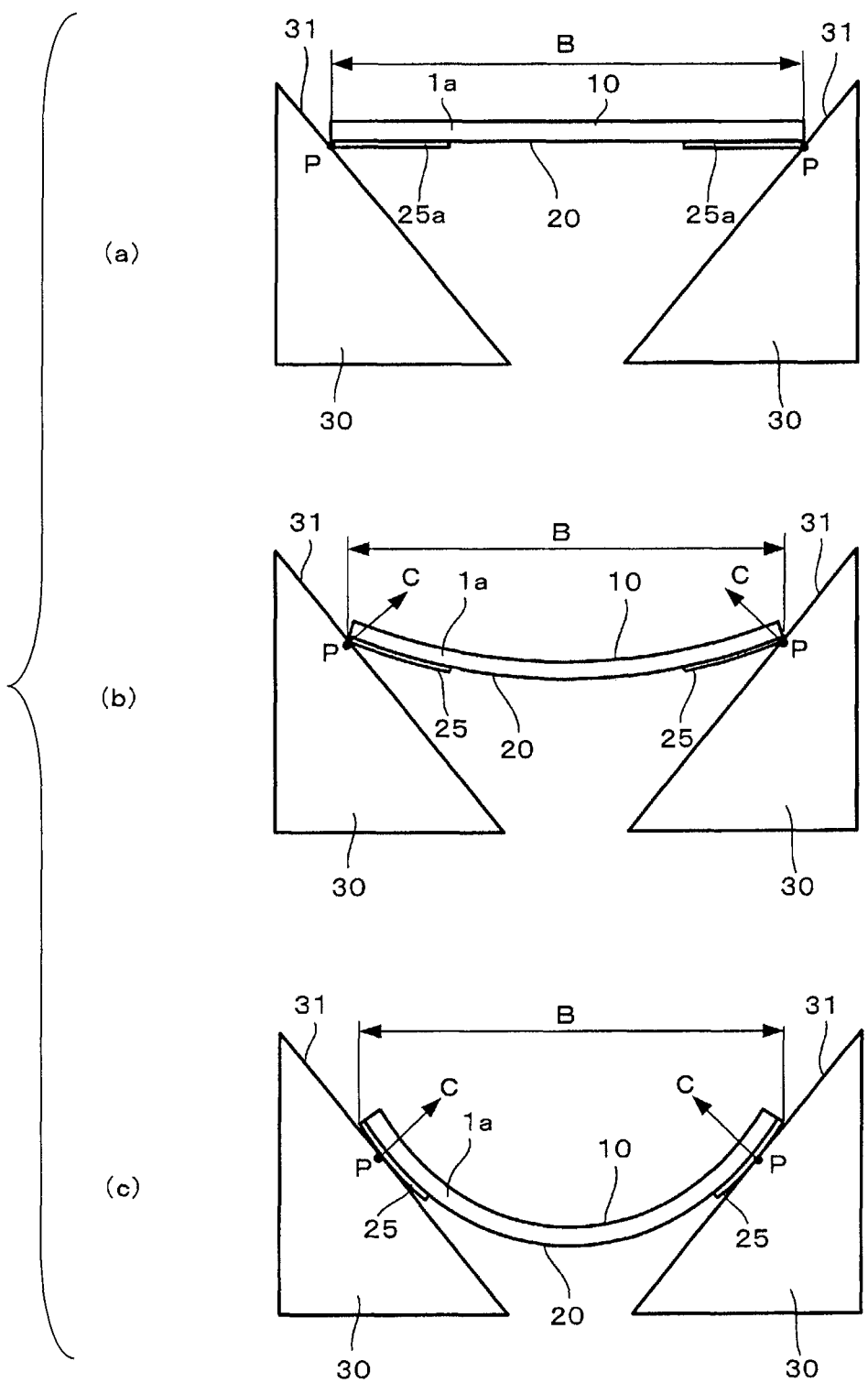
FIG. 3 is schematic diagrams illustrating a glass plate forming method of Means-1 according to the invention; part (a) shows a state at a start of formation, part (b) shows a halfway state of the formation, and part (c) shows a state of completion of the formation.
Figure 4:
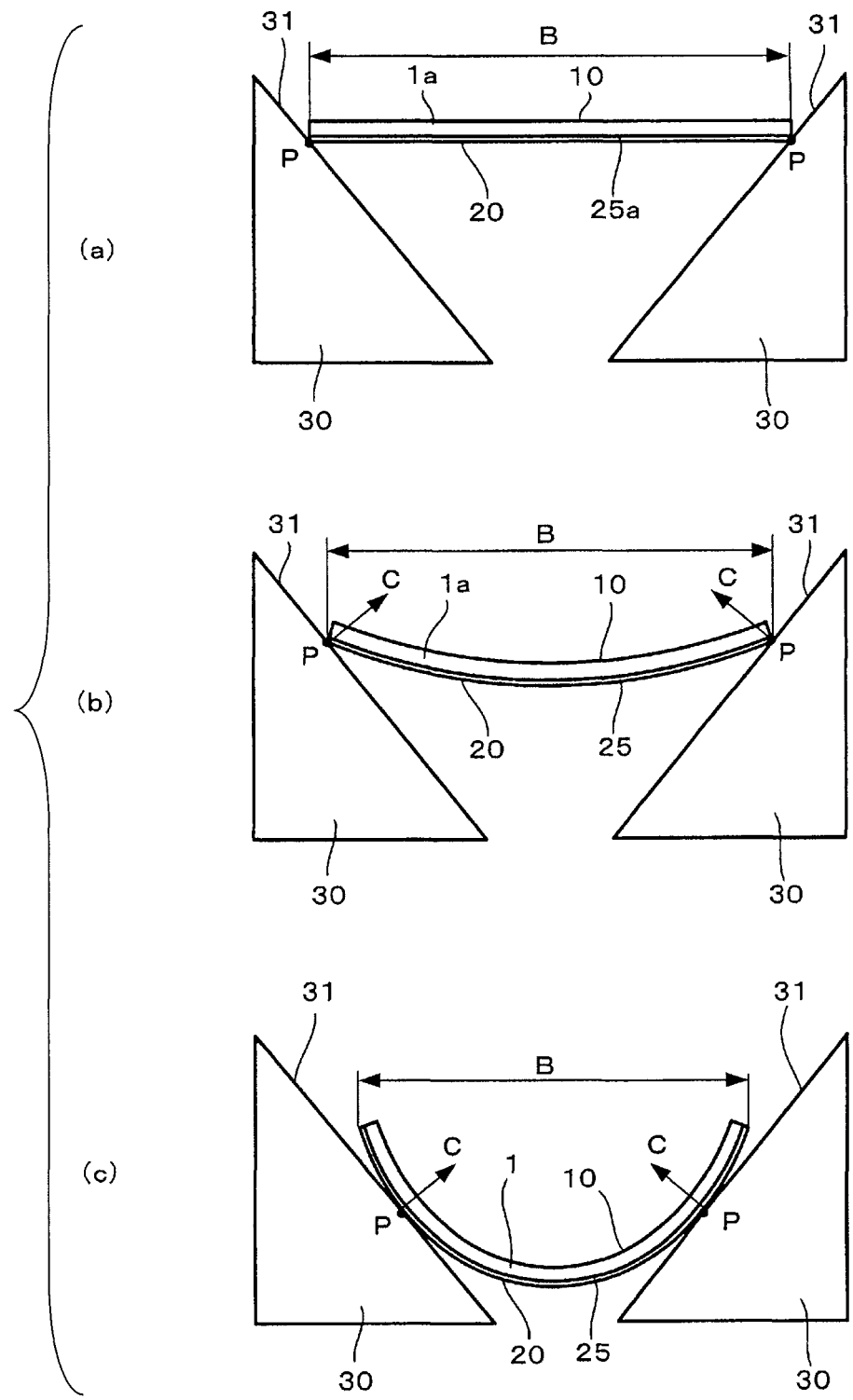
FIG. 4 is schematic diagrams illustrating another glass plate forming method of Means-2 according to the invention; part (a) shows a state at a start of formation, part (b) shows a halfway state of the formation, and part (c) shows a state of completion of the formation.
Figure 5:
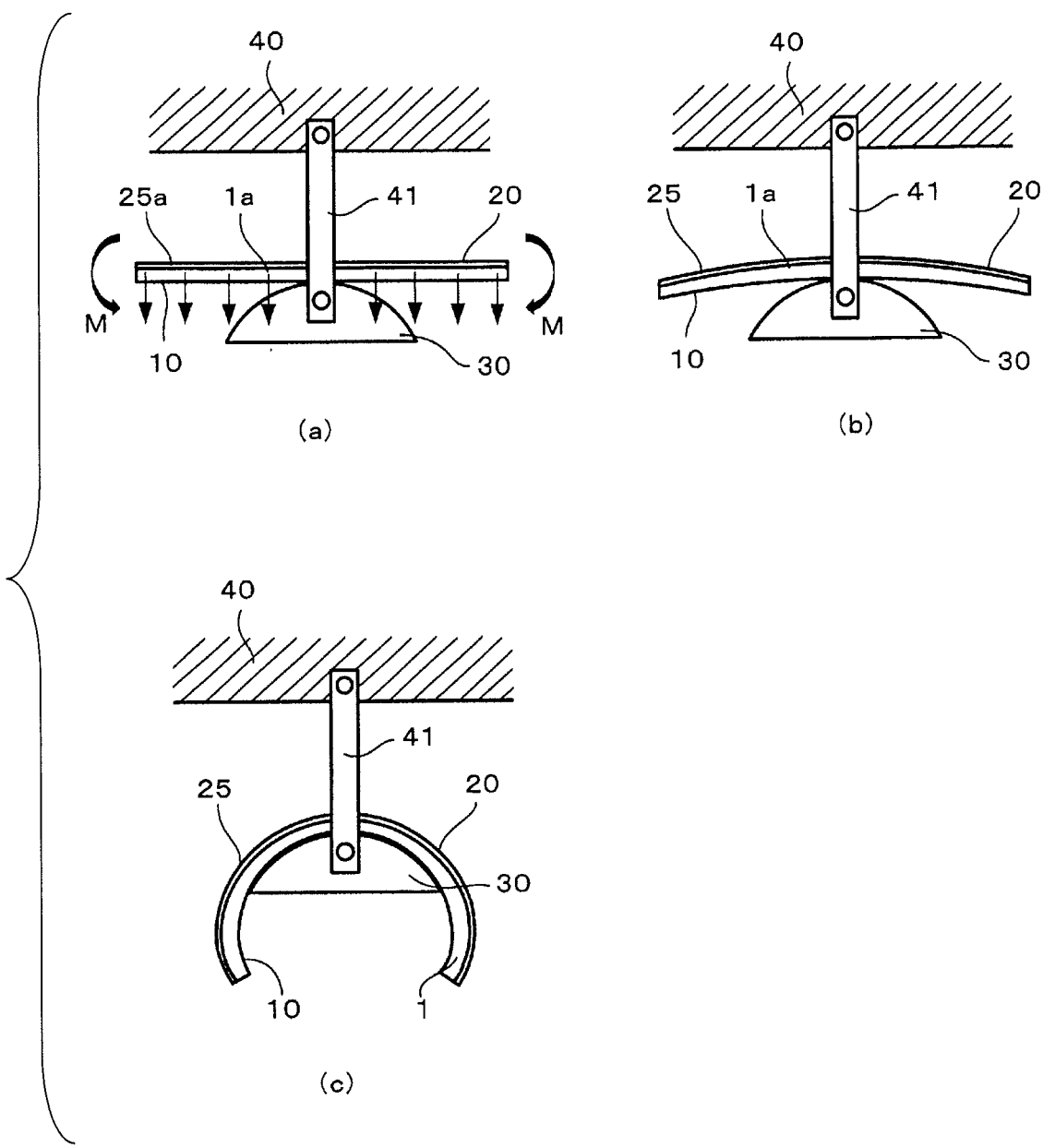
FIG. 5 is schematic diagrams illustrating a further glass plate forming method of Means-3 according to the invention; part (a) shows a state at a start of formation, part (b) shows a halfway state of the formation, and part (c) shows a state of completion of the formation.

A forming method of a glass plates 1 according to an embodiment is described with reference to FIG. 3 to FIG. 5. FIG. 3 to FIG. 5 illustrate forming method Means-1, forming method Means-2, and forming method Means-3, respectively. Each forming method includes (1) a heating step, (2) a chemically strengthening step, and (3) a supporting step.

Means-1

Both end portions of a flat-plate-like glass plate 1*a* are put on base stages (also referred to as support members) 30 and the glass plate 1 is heated at a temperature lower than a softening temperature (see parts (a) and (b) of FIG. 3).

Since the temperature of the heating step is lower than the softening temperature, the glass plate 1*a* is not rendered flowable. Thus, better optical quality is obtained than in common forming in which a glass plate is heated at a temperature equal to or higher than a softening temperature. This is because the probability that distortion or the like occurs in the glass plate due to unintended deformation during the formation is lowered. It is preferable that the temperature of the heating step be lower than an annealing temperature, and even preferable that it be lower than a strain temperature. The probability of occurrence of distortion or the like is lowered further.

During the heating step, at least the two end portions (also referred to as both end portions), opposed to each other, of the second surface 20, among the first surface 10 of the glass plate and the second surface 20 of the glass plate which is opposed to the first surface 10 are subjected to chemical strengthening so that larger compressive stress is provided at the second surface 20 than at the first surface 10 (see parts (b) and (c) of FIG. 3). That is, in this means, the second surface 20 is chemically strengthened partially.

Both end portions are subjected to the chemical strengthening in parallel with the heating step utilizing heat generated by the heating step by applying, for example, a molten salt 25*a* produced from a mixed powder having a composition of $KNO_3:K_2SO_4=1:1$ (mass ratio) uniformly to the two end portions of the second surface 20 of the glass plate 1*a* before the heating step (see part (a) of FIG. 3). Since both end portions are subjected to the chemical strengthening, chemically strengthening treatment layers 25 are formed and expanded (see part (b) of FIG. 3). Driven by the expansion of the chemically strengthening treatment layers 25, deformation proceeds around the first axis T so that the first surface 10 becomes a concave surface and the second surface 20 becomes a convex surface. As a result, the glass plate 1*a* is formed into a curved shape as shown in part (c) of FIG. 3.

During the chemically strengthening step, the two end portions, opposed to each other, of the second surface 20 are supported movably while being urged in such directions as to come closer to each other.

More specifically, the glass plate receives forces indicated by arrows C from the base stages 30 at support points P shown in parts (a) and (b) of FIG. 3. These forces have components of urging the two confronting end portions so that they come closer to each other. Furthermore, since the end portions are movable, when the glass plate 1*a* is thereafter formed into a curved shape being driven by expansion of the chemically strengthening treatment layer 25, the confronting sides of the glass plate 1*a* are lifted and the distance B between them is decreased. Then the deformation of the overall glass plate 1*a* into a curved shape proceeds while the support points P go away from the corner portions and shift gradually toward the center of gravity of the glass plate 1*a* (see part (c) of FIG. 3).

Both end portions, opposed to each other, of the glass plate can be bend-formed sufficiently in such a manner that as described above the two end portions are urged in a movable state in such direction as to come closer to each other.

In Means-1, so that the two end portions are movable, frictional force between the glass plate and a slant side 31 at each support point P needs to be weaker than force that is produced by expansion of the convex surface caused by the chemical strengthening. The deformation of both end portions themselves of the second surface is not obstructed and both end portions can be curved sufficiently.

In this embodiment, in the supporting step, a transition is made automatically to a second support state after a first support state. The first support state is a state that supporting is made in a state that the support members are in contact with the two end portions. The second support state is a state that supporting is made in a state that the support members are not in contact with the two end portions. Such a state transition can be made automatically because the end portions are movable.

Means-1 is further provided with an elastic deforming step for deforming the glass plate elastically so that the second surface 20 becomes a convex surface. When both sides of the flat-plate-like glass plate 1a are put on the base stages 30, a central portion of the glass plate 1a is somewhat warped already due to its own weight and the glass plate 1a is curved around the first axis T to establish a state that it is deformed elastically so as to assume a cylindrical-like shape (i.e., the first surface 10 becomes a concave surface and the second surface 20 becomes a convex surface). By heating the glass plate 1a in this state at a temperature lower than a softening temperature, a state that force always acts on the glass plate 1a in such a direction as to deform it into a cylindrical-like shape due to elastic deformation caused by its own weight through it is not deformed in a flowable manner.

Because of the presence of the elastic deforming step, tensile stress acts on the second surface (convex surface), whereby the chemical strengthening being performed on both end portions comes to spread toward the central portion easily. That is, the elastic deforming step functions to control the expansion directions of the chemically strengthening step. As a result, the glass plate is curved so as to be close to a circular arc around the first axis T. A glass plate can be obtained that is suitable for, for example, a use in which it is bonded to an outer circumferential surface of a cylindrical target object. The elastic deforming step is an optional step.

In this specification, the term "circular arc" does not mean part of a true circle in a strict sense and may be a circular arc that is part of a circle that is close to a true circle. That is, the term "circular arc" is a concept having a certain breadth. The term "cylindrical-like shape" means a shape that is deformed mainly around the first axis T. A cylindrical-like shape means not only what is called a shape that is part of the wall surface of a cylinder but also a shape that is part of the wall surface of a cone.

In this specification, the "end portion" varies depending on the size of a glass plate and hence is not a definite concept. For example, in the case of a glass plate having a length 300 mm, the end portion means a region from the peripheral edge to a position that is 30 mm inside.

The powder to be used in the chemically strengthening step may be melted by performing calcination at about 400° C. for about 5 minutes before the heating step.

To have the second surface 20 be shaped like a circular arc whose center is located at the origin O in cross section, it is preferable that, for example, the heating be performed at about 450° C. for 10 minutes or more.

Although in FIG. 2 the two base stages 3 are opposed to each other, the invention is not limited to this case. For example, a single base stage having a V-shaped groove or a single base stage having a U-shaped groove that is deeper than a circular arc may be used as long as it enables supporting in the same manner as in the above supporting step.

Means-2

Means-2 is described below with reference to FIG. 4. Descriptions of items that are common to Means-1 is omitted.

Like Means-1, Means-2 is provided with a heating step, a chemically strengthening step, and a supporting step. Means-2 is further provided with an elastic deforming step.

In Means-2, the entire second surface 20 is strengthened chemically in the chemically strengthening step. Since the entire second surface 20 is strengthened chemically, in addition to the advantages of Means-1, an advantage is obtained that the entire glass plate can be formed into a curved shape that is closer to a circular arc. A glass plate is obtained that is suitable for, for example, a use in which it is bonded to an outer circumferential surface of a cylindrical target object. The glass plate can be bent into a shape having a smaller radius of curvature than in Means-1 in which chemical strengthening is performed partially. It is possible to satisfy a wider variety of demands relating to the shape.

Where the chemically strengthening treatment is performed uniformly on the second surface, a chemically strengthening treatment layer 25 tends to expand also uniformly irrespective of the position on the second surface in cross section (see part (b) of FIG. 4). As a result, as shown in part (c) of FIG. 4, driven by the uniform expansion of the chemically strengthening treatment layer 25, the glass plate 1a tends to be formed into a shape that is closer to a circular arc. The term "uniform" used in this specification is a concept that allows an error in such a range that the advantages of this application are not lost.

Means-3

Means-3 is described below with reference to FIG. 5. Descriptions of items that are common to Means-1 is omitted.

Like Means-1, Means-3 is provided with a heating step, a chemically strengthening step, and a supporting step. Means-3 is further provided with an elastic deforming step.

A glass plate 1 is heated at a temperature lower than a softening temperature in a state that a base stage 30 which is approximately circular in cross section is fixed to a ceiling 40 or the like by a support member 41 and an approximately central portion of a flat-plate-like glass plate 1a is put on and fixed to the base stage 30 (see parts (a) and (b) of FIG. 5).

A second surface 20 is strengthened chemically while the heating step is executed (see parts (b) and (c) of FIG. 5).

In parallel with the heating step, the second surface 20 is strengthened chemically utilizing heat generated by the heating step. When the second surface 20 is strengthened chemically, a chemically strengthening treatment layer 25 is formed and expanded. Driven by the expansion of the chemically strengthening treatment layer 25, deformation proceeds around the first axis T so that the first surface 10 becomes a concave surface and the second surface 20 becomes a convex surface. As a result, the glass plate 1a is formed into a curved shape as shown in part (c) of FIG. 5.

During the chemically strengthening step, two end portions, opposed to each other, of the second surface 20 are supported movably while being urged in such directions as to come closer to each other.

More specifically, as shown in part (a) of FIG. 5, gravity (indicated by arrows) acts on the glass plate only the central portion of which is supported, as a result of which bending moment M acts on both end portions and hence both end portions are urged in such directions as to come closer to each other. Furthermore, since no part of the support member is in contact with the end portions, both end portions are in a movable state. Thus, driven by the expansion of the chemically strengthening treatment layer 25, both end portions of the glass plate can be bend-formed sufficiently.

Although in part (c) of FIG. 5 the base stage 30 is shaped like a circular arc in cross section, the invention is not limited to this case. The base stage 30 may be rectangular or cylindrical in cross section and support only a central portion of the glass plate 1. The external shape of the base stage 30 need not be parallel with the second surface of a formed glass plate 1. The base stage 30 may be divided into plural parts and support the glass plate 1 discontinuously.

Although in Means-3 the entire second surface 20 is strengthened chemically, Means-3 may be modified so that only both end portions are strengthened chemically as in Means-1. A curved shape of the glass plate becomes closer to a circular arc by chemically strengthening the entire second surface 20.

Means-3 is further provided with an elastic deforming step for deforming the glass plate elastically so that the second surface 20 becomes a convex surface. When the flat-plate-like glass plate 1a is put on the base stage 30, both end portions of the glass plate 1a are already warped due to its own weight and the glass plate 1a is curved around the first axis T to establish a state that the glass plate 1a is deformed elastically so as to assume a cylindrical-like shape (i.e., the first surface 10 becomes a concave surface and the second surface 20 becomes a convex surface). Because of the presence of the elastic deforming step, the directions of expansion in the chemically strengthening step can be controlled and the glass plate is curved so as to be close to a circular arc around the first axis T. A glass plate can be obtained that is suitable for, for example, a use in which it is bonded to an outer circumferential surface of a cylindrical target object. The elastic deforming step is an optional step.

In the second embodiment, since its arrangement is opposite to the arrangement of the first embodiment, the first axis T (not shown) is located under the base stage 30.

The mechanism of how both end portions are formed satisfactorily by the heating step, the chemically strengthening step, and the supporting step is analyzed as follows. That is, it is considered that since both end portions are supported in a state that they are movable and urged in such directions as to come closer to each other, the chemical strengthening causes both end portions to expand in such directions as to come closer to each other, whereby both end portions are formed satisfactorily.

In contrast, in the techniques listed as Patent documents 1 and 2, since both end portions are supported fixedly, both end portions cannot be formed satisfactorily.

For both end portions to be formed satisfactorily, it is preferable that the radius of curvature of both end portions of the glass plate be equal to or smaller than the radius of curvature of its central portion.

Furthermore, the mechanism of how the glass plate is formed into a circular arc shape with the elastic deforming step provided additionally is analyzed as follows. That is, by elastically deforming the entire glass plate in advance into a cylindrical shape that is curved around the first axis T, the direction of deformation of the glass plate that is caused by expansion of the overall convex surface can be guided to one direction (i.e., around the first axis T). Still further, since the entire glass plate, in particular, both end portions, can be deformed freely, that is, without being bound, in the first embodiment the glass plate is deformed into a circular arc shape so as to be parallel with a circle having the slant sides 31 as tangential lines. Although the reason for this phenomenon is not entirely clear, one explanation would be that a circular shape is a most stable state.

Although example methods for forming the glass plate 1 has been described above in the form of Means-1 to Means-3, the invention is not limited to those methods and there are no particular limitations on the forming method except that both end portions in a cross section of the second surface 20 can be bend-formed satisfactorily. For example, a forming process may be performed plural times repeatedly, which makes it possible to control the cross-sectional stress distribution (CS or DOL) of the chemical strengthening.

The entire surfaces of a glass plate 1 or 1a may be subjected to uniform chemically strengthening treatment after the forming process. This would increase the strength of the front and back surface while enabling control for attaining a desired round shape.

A glass plate manufactured by Means-2 of this application is described below in detail.

Certain "surface compressive stress" exists in both surfaces (first surface 10 and second surface 20) of the glass plate 1 whose second surface 20 is curved like a convex surface. In this specification, the term "surface compressive stress" is defined as the sum of two kinds of compressive stress, that is, "compressive stress produced by ion exchange" and "bending compressive stress" produced by elastic deformation. In this embodiment, "compressive stress produced by ion exchange" is produced in the second surface 20 due expansion by ion exchange in the chemically strengthening step and "bending compressive stress" is produced by elastic deformation in the first surface 10. Receiving these stress, the first surface 10 and the second surface 20 are prone to scratching.

Although in this embodiment only the second surface 20 is subjected to chemical strengthening, the invention is not restricted to this case. Both of the second surface 20 and the first surface 10 may be subjected to chemical strengthening, in which case compressive stress is produced by ion exchange also in the first surface 10. Where both of the second surface 20 and the first surface 10 are strengthened chemically, it is preferable that the compressive stress produced by ion exchange in the second surface 20 be larger than that in the first surface 10. This makes it easier for the glass plate 1 to have a circular arc which is a beautiful curved shape.

It is preferable that the surface compressive stress produced by ion exchange in the second surface 20 be larger than the absolute value of the bending compressive stress produced in the first surface 10. When the absolute value of the bending compressive stress produced in the first surface 10 is large, the bending tensile stress produced in the second surface 20 is also large. The second surface 20 is made less prone to scratching by setting the surface compressive stress produced by ion exchange in the second surface 20 larger than the bending tensile stress. It is preferable that the second surface 20 be less prone to scratching because it is a surface to become an outside surface in, for example, a use in which the glass plate 1 is bonded to an outer circumferential surface of a cylindrical target object.

It is preferable that the surface compressive stress in the second surface 20 be larger than the surface compressive stress in the first surface 10. For example, this can be attained in a case that the surface compressive stress produced by ion exchange in the second surface 20 is larger than the surface compressive stress produced by ion exchange in the first surface 10 and the absolute value of the bending compressive stress produced in the first surface 10 is much smaller than the surface compressive stress produced by ion exchange in the second surface 20. In this case, the second surface 20 is not prone to scratching.

EXAMPLES

The fact that the glass plate 1 according to the embodiment is a glass plate both end portions of which are formed satisfactorily is described through comparison between Examples and Comparative Example.

Figure 6:
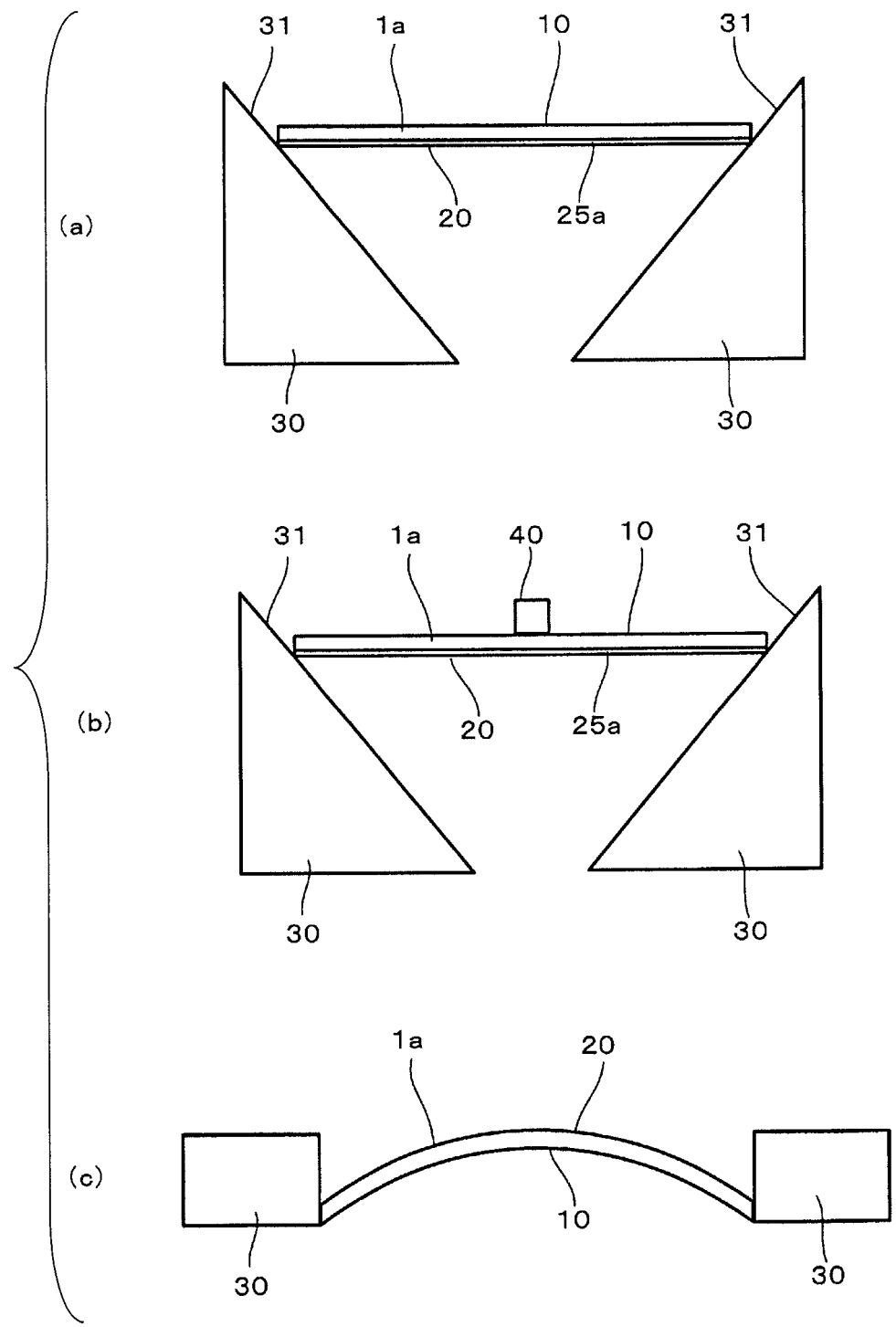
FIG. 6 is schematic diagrams showing manufacturing methods of evaluation samples of glass plates according to the invention; part (a) shows a forming method of Means-2, part (b) shows a forming method in which a weight was put on a glass plate additionally, and part (c) shows a forming method of Comparative Example.
Figure 7:
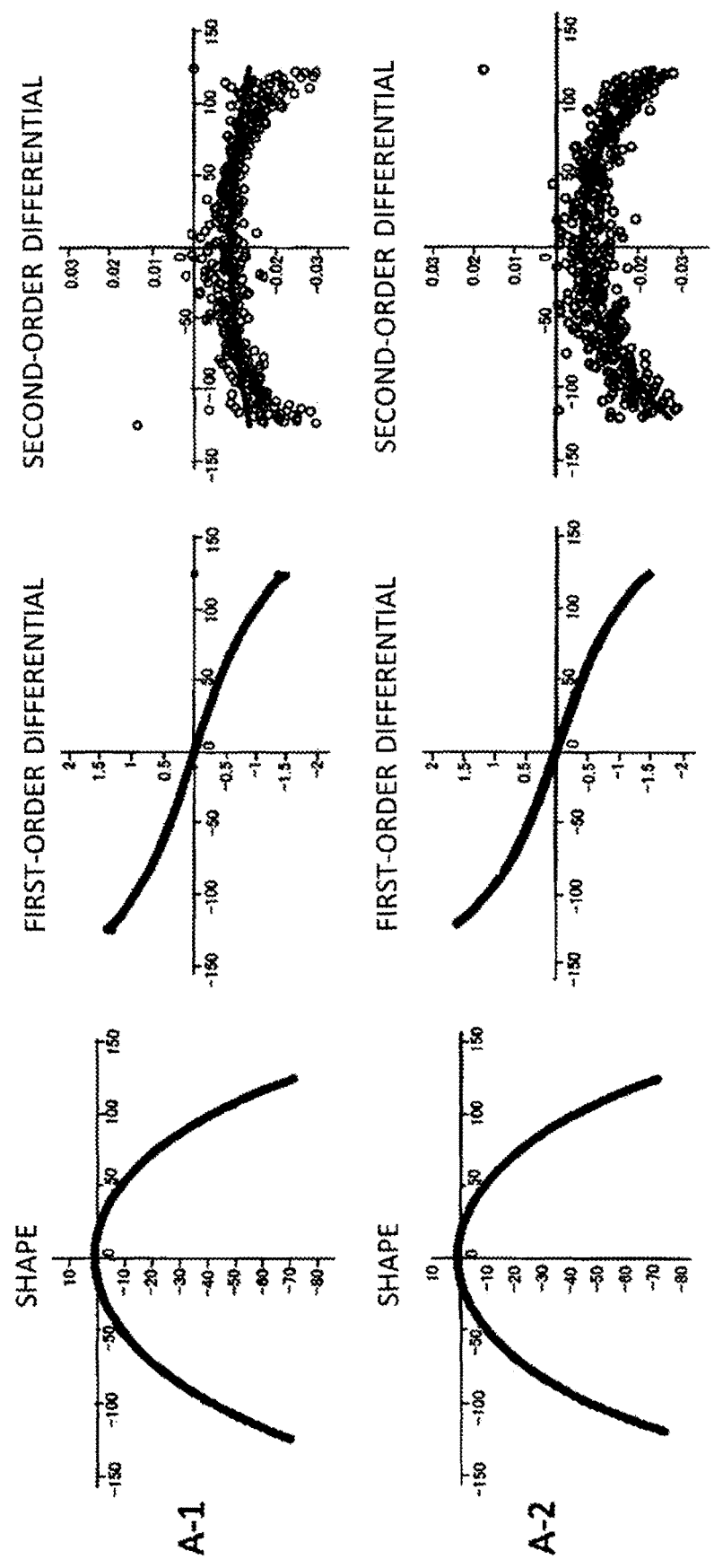
FIG. 7 is a table illustrating a procedure for determining a second-order coefficient of a quadratic curve obtained from an evaluation sample.
Figure 8:
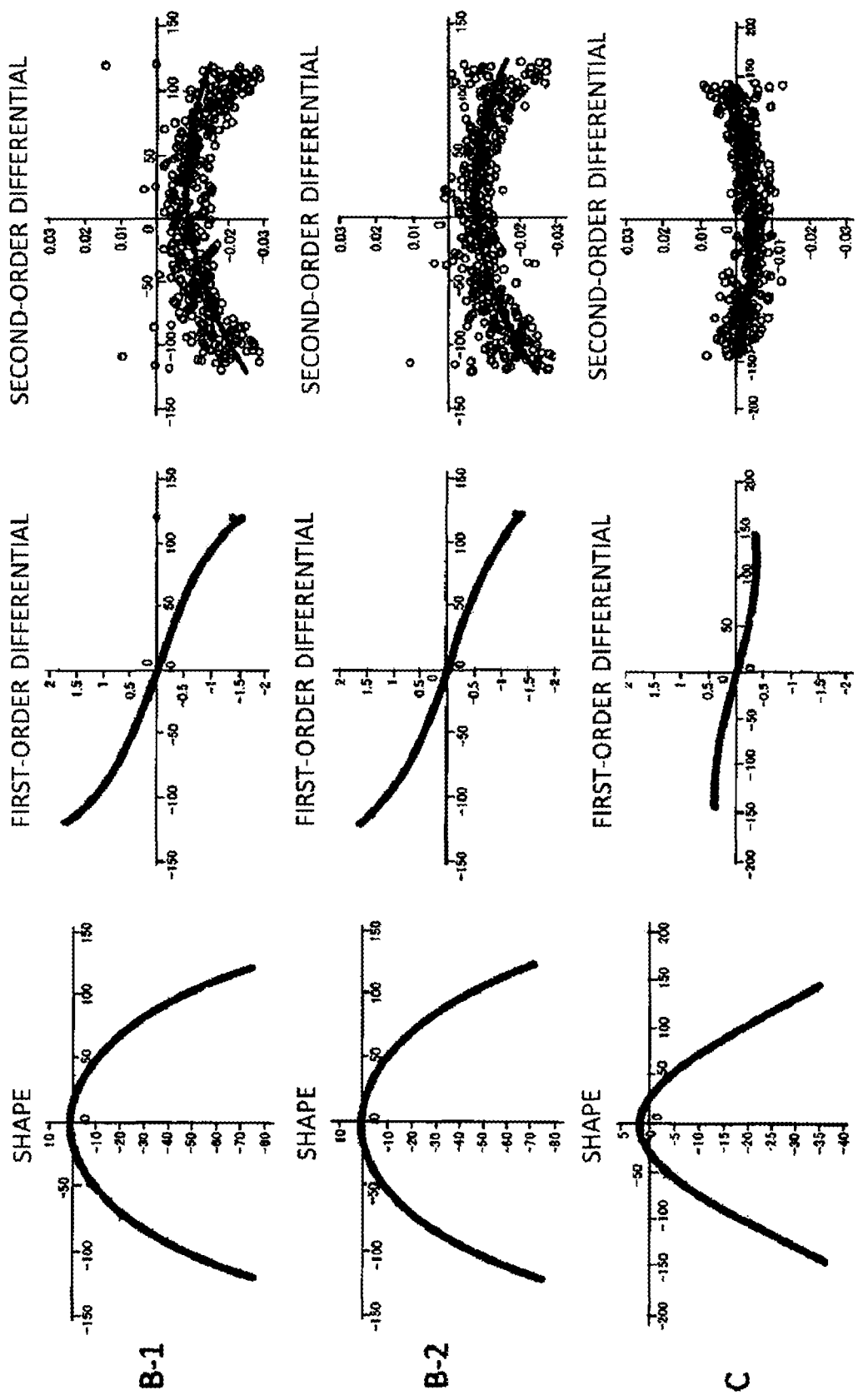
FIG. 8 is a table that is a continuation of the table of FIG. 7 and constitutes a single table together with it.

Glass plates according to the embodiment were manufactured by the manufacturing method of Means-2 and a sample of Comparative Example was also manufactured. The advantages of this application were checked by determining a second-order coefficient of a quadratic curve that approximates second-order differential values of a locus of a partial shape of a portion, in a positive Y value region, of a cross section of the second surface 20. FIG. 6 shows manufacturing methods of the samples of Examples and the sample of Comparative Example, and FIG. 7 and FIG. 8 summarize results of those samples.

Samples of Examples A-1 and A-2 were manufactured by the method of Means-2. More specifically, a soda-lime glass having a size 300 mm×50 mm×0.33 mm was prepared. The glass composition as represented by mole percentages is 71.1% of $SiO_2$, 1.1% of $Al_2O_3$, 12.4% of $Na_2O$, 0.2% of $K_2O$, 6.9% of $MgO$, and 8.3% of $CaO$. Then an inorganic salt (molten salt 25a) in powder form was applied to the second surface 20 and calcined at 400° C. The composition of the inorganic salt in powder form was $K_2SO_4:KNO_3=1:1$ (mass ratio). Then, as shown in part (a) of FIG. 6, two base stages having a slant angle 60° were disposed so as to be spaced from each other by 80 mm and the glass plate was mounted thereon so that its second surface becomes a convex surface (see FIG. 2). Subsequently, a chemically strengthening step was executed at about 450° C. for about 10 hours, whereby samples of Examples A-1 and A-2 were obtained. As for Examples B-1 and B-2, a chemically strengthening step was executed in a state that a glass plate was mounted on the base stages and a weight of about 50 g was put on the first surface (see part (b) of FIG. 6). The other conditions were the same as in Example A-1.

As for Comparative Example C, a glass plate 1a was deformed plastically by heating it at 511° C. for 2 hours without executing a chemically strengthening step in a state that the glass plate 1a was held between base stages 30 from both sides and deformed elastically (see part (c) of FIG. 6). At this time, the distance between the base stages was 280 mm. Comparative Example C was an experiment as a reproduction of Patent document 1.

Numbers such as "-1" each of which is part of a symbol of each sample indicate plural respective experiments carried out.

As for the shape of each curved glass plate, the entire convex surface of the glass plate was measured three-dimensionally and rendered into polygon data using a 3D measurement system "ATOS TripleScan" of GOM GmbH and data of a central cross section in the bending direction of the polygon data were extracted at a measurement pitch 0.1 mm. A sample was put on the slant surfaces in a state that it was convex upward and its lower one side adjoining each slant surface was supported; however, the measurement mode is not limited to the one described above. The measurement instrument is not limited to ATOS and a laser displacement meter, a contact-type measurement instrument, etc. may be used.

FIG. 7 and FIG. 8 show measurement results of shapes of curved glass plates. A single table is divided into two tables because of a limited description space.

Graphs accompanied by a word "shape" at the top (i.e., the graphs in the leftmost column of each table) in FIG. 7 each show a locus of row data themselves that were obtained by measuring a cross section of the second surface 20 of a glass plate 1. One plot of the row data indicates an average value of 10 points (corresponding to 1 mm) measured at a pitch 0.1 mm.

A line segment (locus) connecting two optional points on the curve of each graph in the "shape" column was regarded as a tangential line and a first-order differential value was calculated as its gradient. That is, (first-order differential value)=(gradient of line segment connecting two points)/(distance between two points). The distance between two points is 1 mm, for example. A graph accompanied by a word "first-order differential" in the central column is a graph obtained by arranging calculated values over the total length of the leftmost graph.

A graph accompanied by a word "second-order differential" in the rightmost column is a graph obtained in the same manner by plotting second-order differential values on the basis of the first-order differential values in the graph in the central column. Subsequently, a quadratic equation $y=ax^2+bx+c$ that approximates the plotted second-order differential values was derived by a prescribed method (e.g., least squares method) and a graph of a quadratic curve was drawn.

By comparing the quadratic curves shown in the column of "second-order differential" of Examples with the quadratic curve of Comparative Example, it is clearly understood that the quadratic curves of Examples are convex upward and the quadratic curve of Comparative Example is convex downward.

That is, it has been found that a glass plate 1 according to the embodiment both end portions of which are bend-formed satisfactorily as seen from the graphs of the samples of Examples in the "shape" column (graphs in the leftmost column) has, in actuality, a negative second-order coefficient of a quadratic curve that approximates second-order differential values, and that a glass plate both end portions of which are not bend-formed satisfactorily as in Comparative Example has a positive second-order coefficient of a quadratic curve. More specifically, it can be said that a quadratic curve that approximates second-order differential values of a locus of a partial shape of a portion in a positive Y value range (i.e., the central angle θ is 180° or smaller) has a negative second-order coefficient.

Thus, both end portions of the glass plate 1 according to the embodiment are formed satisfactorily as a result of the fact that the second-order coefficient of a quadratic curve as an approximation is negative, that is, the quadratic curve is convex upward as in the graphs of Examples in the "second-order differential" column (rightmost column).

It is seen from comparison between Examples A-1 and A-2 and Examples B-1 and B-2 that a scatter at the time of formation can be suppressed by using a weight.

It is preferable that the absolute value of the coefficient of $x^2$ of a quadratic equation representing a quadratic curve that approximates second-order differential values in a positive Y value region be $1\times10^{-7}$ or larger. As the coefficient becomes larger, the convex shape of the quadratic curve becomes narrower, which means that both end portions of the glass plate 1 are bent more sufficiently. In the first embodiment (part (a) of FIG. 2), this means that a locus of the second surface 20 from the first point 21 to the second point 22 is curved along a circular arc. In the second embodiment (part (b) of FIG. 2), this means that a locus of the second surface 20 from the first point 21 to the third point 23 is curved along a circular arc. It is even preferable that the absolute value of the coefficient of $x^2$ be $2\times10^{-7}$ or larger, and further preferable that it be $3\times10^{-7}$ or larger.

The overall shape of a glass plate manufactured by Means-2 is a circular arc. This is described below in detail by comparing Examples with Comparative Examples.

Whether a glass plate is shaped like a circular arc is evaluated by a method of determining a virtual circular arc having a radius of curvature R that corresponds to a sectional shape of the glass plate and determining a range of values that are dimensionless (unitless) by making a calculation using values obtained from the virtual circular arc and an index value.

A virtual circular arc as a base of the calculation is determined according to the following procedure. The procedure is described with reference to FIG. 10.

Distances between optional points in a formed second surface 20 and the origin O are measured, their average is determined, values that minimize the sum of differences between the average and the optional points in the second surface 20 are determined by the least squares method, and a virtual circular arc having a radius of curvature R is determined.

Figure 10:
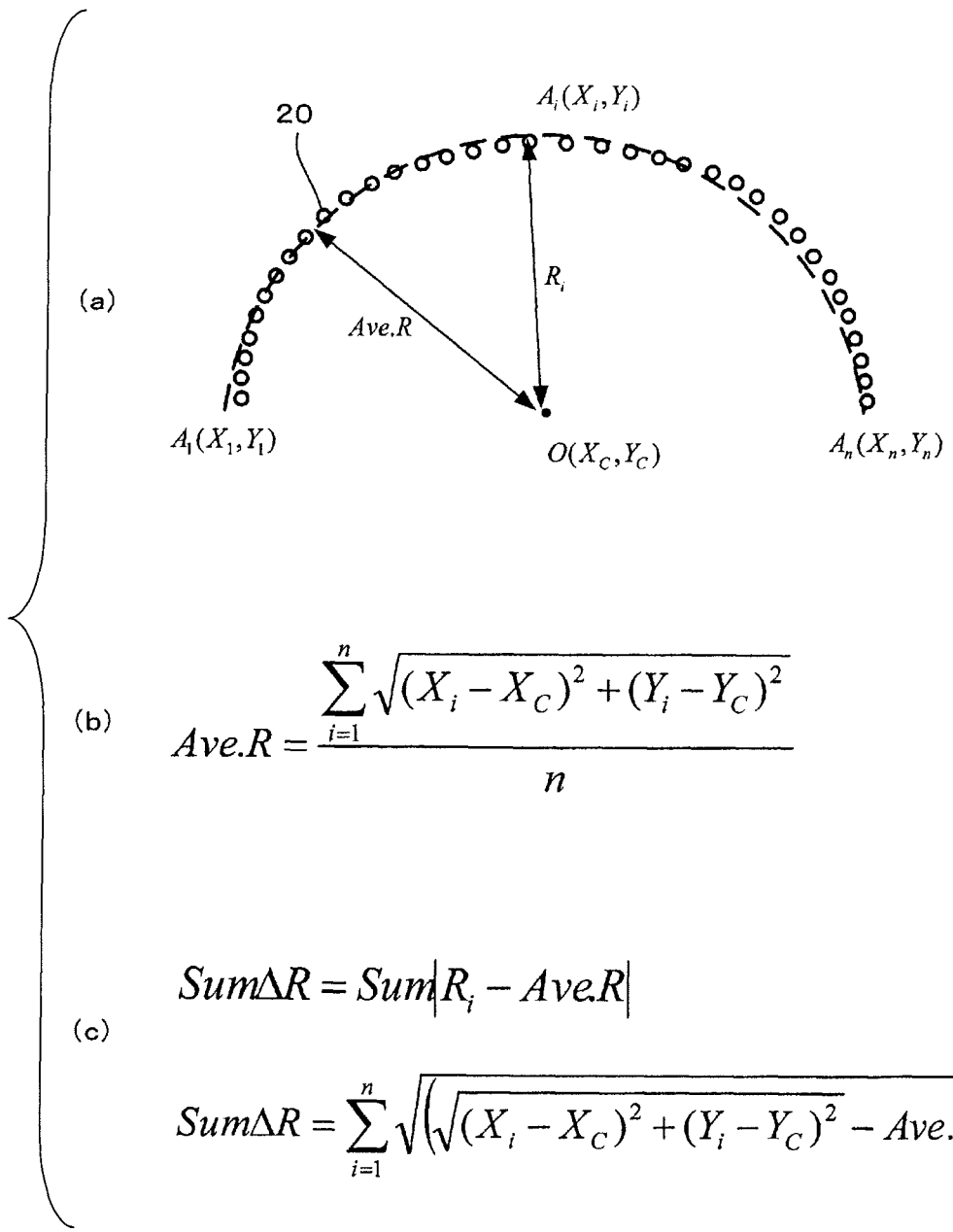
FIG. 10 shows an example method for determining a virtual circular arc of a glass plate according to an embodiment; part (a) is a conceptual diagram, part (b) shows formulae for calculating an average radius Ave.R, and part (c) shows a formula for calculating the sum total SumΔR of absolute values.

As shown in part (a) of FIG. 10, XY coordinates are used in the embodiment in a method for determining a virtual circular arc. The coordinates of the origin O are represented by (Xc, Yc). The coordinates of each optional point (indicated by mark "o" in part (a) of FIG. 10) in a second surface 20 are represented by (Xi, Yi). The distance Ri between the two points can be calculated using a common formula, that is, the square root of the sum of squares of (Xi−Xc) and (Yo−Yc). An average radius Ave.R is determined by dividing a sum total ΣRi by the number n of measurement points (the formula is shown in part (b) of FIG. 10 and an average radius is represented by a broken line curve shown in part (a) of FIG. 10). Then the sum total SumΔR of the absolute values of differences between distances Ri between two points and the average radius Ave.R is determined (see part (c) of FIG. 10) and a virtual circular arc having a radius of curvature R that minimizes the sum total SumΔR is determined.

Figure 11:
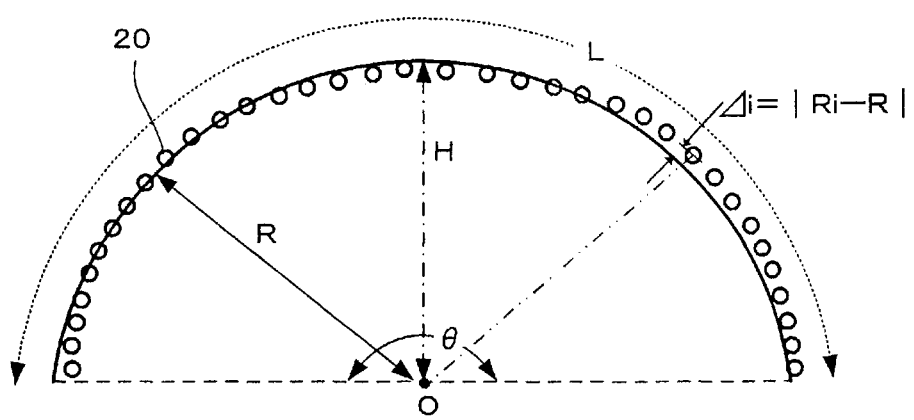
FIG. 11 is an explanatory diagram showing a virtual circular arc of a glass plate according to the invention and a definition of a coordinate system.

An index L×(H/R) to be used for obtaining a dimensionless value is defined on the basis of the thus-determined virtual circular arc so that the beautifulness of a circular arc can be evaluated consistently even in a case that a glass plate 1 according to the embodiment is curved so as to have a different size or a bending depth. L, H, and R represent the arc length, camber, radius of curvature, respectively (see FIG. 11). The average Δ of the absolute values (Δi=|Ri−R|) of differences between points on the cross section of the second surface 20 and points on the virtual circular arc in radial directions going from the origin O to the virtual circular arc is employed as an index value, and the following Formula (1) is formulated:

$$\Delta/\{L\times(H/R)\} \qquad (1)$$

In the embodiment, the circular arc shape of the second surface 20 of the glass plate 1 is desirable if a value calculated according to Formula (1) is smaller than 0.020 because it is close to part of a true circle. The desirability of the value of Formula (1) increases further as it becomes 0.010 or smaller, 0.008 or smaller, 0.007 or smaller, 0.005 or smaller, 0.004 or smaller, and 0.003 or smaller in this order because the closeness to part of a true circle of the circular arc shape increases in this order.

Furthermore, a first point D and a second point E are defined as points that are most distant from the origin O and closest to the origin O, respectively, in the second surface 20 of the glass plate 1 and the difference M (=D−E) between the distance from the origin O to the first point D and the distance from the origin O to the second point E is employed as another index value, and the following Formula (2) is formulated:

$$M/\{L\times(H/R)\} \qquad (2)$$

In the embodiment, the circular arc shape of the second surface 20 of the glass plate 1 is desirable if a value calculated according to Formula (2) is smaller than 0.121 because it is close to part of a true circle. The desirability of the value of Formula (2) increases further as it becomes 0.10 or smaller, 0.08 or smaller, 0.05 or smaller, and 0.03 or smaller in this order because the closeness to part of a true circle of the circular arc shape increases in this order.

It is clear from the table of FIG. 9 that the values of Formula (1) of Examples are different from the value of Formula (1) of Comparative Example by one order and the values of Formula (2) of Examples are different from the value of Formula (2) of Comparative Example also by one order; the differences are thus obvious. That is, it is understood that Examples produced circular arcs that were far closer to part of a true circle than the Comparative Example (conventional example) did.

It is also understood from the table of FIG. 9 that the minimum value of Formula (1) of Comparative Example is 0.02 which is the value of Comparative Example C (the experiment as a reproduction of Patent document 1) and the values of Examples are smaller than this value. It is therefore desirable that the value calculated according to Formula (1) be smaller than 0.02 because in this case a circular arc shape of the second surface 20 of the glass plate 1 becomes close to part of a true circle.

It is understood from the table of FIG. 9 that the minimum value of Formula (2) (Comparative Example) is 0.121 which is the value of Comparative Example C of the experiment as a reproduction of Patent document 1 and the values of Examples are smaller than this value. It is therefore desirable that the value calculated according to Formula (2) be smaller than 0.121 because in this case a circular arc shape of the second surface 20 of the glass plate 1 becomes close to part of a true circle.

Furthermore, it can be said that a circular arc shape of the second surface 20 is close to part of a true circle if the radius of curvature R of a virtual circular arc is 270 mm or shorter. Bending to a small radius of curvature R is possible and it is possible to satisfy a variety of demands relating to the shape.

The present application claims priority from Japanese Patent Application No. 2017-007799 filed with the Japanese Patent Office on Jan. 19, 2017, and the entire contents of Japanese Patent Application No. 2017-007799 are invoked in this application.

The invention is not limited to the above embodiments and various modifications, improvements, etc. can be made as appropriate. The materials, shapes, sets of dimensions, sets of numerical values, forms, numbers, locations, etc. of the respective constituent elements of each of the above embodiments are not limited to those disclosed and can be determined in desired manners as long as the invention can be implemented.

INDUSTRIAL APPLICABILITY

The glass plate and its forming method according to the embodiment can be applied suitably to fields in which a glass plate both end portions of which are bent sufficiently for use as, for example, a cover glass of a camera that is installed in a vehicle or the like.

DESCRIPTION OF SYMBOLS

1: Glass plate
1a: Flat-plate-like glass plate
10: First surface
20: Second surface
21: First point (end point)
22: Second point (end point)
23: Third point (end point)
25: Chemically strengthening treatment layer
30: Base stage

The invention claimed is:

1. A glass plate having:
a first surface; and
a second surface which is opposed to the first surface, wherein
the glass plate is curved around a first axis in such a manner that the first surface is a concave surface and the second surface is a convex surface,
in a cross sectional view of a plane that is perpendicular to the first axis,
at least both end portions of the second surface are chemically strengthened and compressive stress produced by ion exchange in both of the end portions of the second surface is larger than compressive stress produced by ion exchange in both end portions of the first surface, and
when an X axis is defined as a line including a line segment that connects one end point on the cross section of the second surface and a point, most distant from the one end point of the second surface, on the cross section of the second surface, a Y axis is defined as a line that passes a center point of the line segment and is perpendicular to the X axis, an origin is defined as an intersection of the X axis and the Y axis, and a positive direction of the Y axis is defined as a direction, going from a first surface side toward a second surface side, of the Y axis,
a second-order coefficient of a quadratic curve that approximates second-order differential values of a locus of a partial shape of a portion in a positive Y value region in the cross section of the second surface is negative,
wherein the second surface is chemically strengthened in its entirety, a virtual circular arc is defined as a circular arc around the origin that approximates the cross section of the second surface by a least squares method, and when the cross section of the second surface is compared with the virtual circular arc, a value obtained according to Formula (1) shown below is smaller than 0.02, where A is an average of absolute values of differences between each point on the cross section of the second surface and each point on the virtual circular arc in a radial direction going from the origin toward the virtual circular arc:

$$A/\{L \times (H/R)\} \qquad (1);$$

where
R: a radius of curvature of the virtual circular arc;
H: a camber of the virtual circular arc; and
L: an arc length of the virtual circular arc.

2. The glass plate according to claim 1, wherein the first surface has bending compressive stress.

3. The glass plate according to claim 1, wherein surface compressive stress in the second surface is larger than that in the first surface.

4. The glass plate according to claim 1, wherein
the second surface is chemically strengthened in its entirety,
a virtual circular arc is defined as a circular arc around the origin that approximates the cross section of the second surface by a least squares method,
the second surface has a first point that is most distant from the origin and a second point that is closest to the origin, and
a value calculated according to Formula (2) shown below is smaller than 0.121, where M is a difference between a distance from the origin to the first point and a distance from the origin to the second point:

$$M/\{L \times (H/R)\} \qquad (2)$$

where
R: a radius of curvature of the virtual circular arc;
H: a camber of the virtual circular arc; and
L: an arc length of the virtual circular arc.

5. The glass plate according to claim 1, wherein a central angle of a sector that is formed by connecting both of the end points of the cross section of the second surface and the origin is larger than 180°.

6. The glass plate according to claim 1, wherein a central angle of a sector that is formed by connecting both of the end points of the cross section of the second surface and the origin is 180°.

7. The glass plate according to claim 1, wherein an absolute value of a coefficient of $x^2$ of a quadratic formula representing a quadratic curve that approximates second-order differential values of a portion in a positive Y value region of the cross section of the second surface is $1 \times 10^{-7}$ or larger.

8. The glass plate according to claim 1, wherein a radius of curvature of a circular arc that approximates the cross section of the second surface by a least squares method is 270 mm or shorter.

9. A glass plate forming method according to claim 1 comprising:
a heating step of heating a glass plate to a temperature that is lower than a softening temperature;
a chemically strengthening step of chemically strengthening two end portions opposed to each other of a second surface, among a first surface of the glass plate and the second surface of the glass plate that is opposed to the first surface, during the heating step so that compressive stress in the second surface is larger than that in the first surface; and
a supporting step of supporting the two end portions in a movable state while urging the two end portions in such directions that they come closer to each other, during the chemically strengthening step.

* * * * *